United States Patent [19]

Derrien

[11] Patent Number: 5,271,314
[45] Date of Patent: Dec. 21, 1993

[54] RAISABLE ANTI-CRASH SHOCK ABSORBER

[75] Inventor: Michel Derrien, Versailles, France
[73] Assignee: Messier-Bugatti, Velizy-Villacoublay, France
[21] Appl. No.: 945,602
[22] Filed: Sep. 16, 1992

[30] Foreign Application Priority Data

Sep. 17, 1991 [FR] France .................. 91 11437

[51] Int. Cl.⁵ .................. F15B 15/22; F16F 7/12; B64C 25/58
[52] U.S. Cl. .................. 92/8; 92/82; 92/143; 188/371; 244/104 FP
[58] Field of Search .................. 92/8, 51, 81, 82, 143; 188/371, 376, 377, 322.13; 267/64.15, 64.26; 244/104 FP; 297/216

[56] References Cited

U.S. PATENT DOCUMENTS

| 193,694 | 7/1877 | Dick | 267/64.15 |
|---|---|---|---|
| 2,348,160 | 5/1944 | Thornhill | 267/64.15 |
| 3,265,163 | 8/1966 | Gilbert et al. | 188/377 X |
| 3,290,037 | 12/1966 | Robinson, Jr. et al. | 267/64.26 |
| 4,291,850 | 9/1981 | Sharples | 244/104 FP X |
| 4,886,248 | 12/1989 | Delhaye et al. | 267/64.26 |
| 5,094,407 | 3/1992 | Jampy et al. | 244/104 FP |
| 5,145,206 | 9/1992 | Williams | 267/64.26 X |

FOREIGN PATENT DOCUMENTS

| 723045 | 12/1965 | Canada | 267/64.15 |
|---|---|---|---|
| 0072323 | 8/1982 | European Pat. Off. | |
| 3526156 | 1/1987 | Fed. Rep. of Germany | 267/64.15 |
| 992347 | 10/1951 | France | 267/64.15 |
| 2608242 | 12/1986 | France | |
| 473642 | 10/1975 | U.S.S.R. | 244/104 FP |
| 2020780 | 5/1979 | United Kingdom | |

Primary Examiner—Edward K. Look
Assistant Examiner—John Ryznic
Attorney, Agent, or Firm—Sixbey, Friedman, Leedom & Ferguson

[57] ABSTRACT

The shock absorber comprises a strut, a sliding rod slidably mounted relative to the strut and co-operating therewith to define both a shock absorbing chamber and a raising chamber which is connected to a member for feeding it with raising liquid, a dip tube defining a lowering chamber and connected to a member for feeding it with a lowering liquid, and in which a lowering piston is disposed, which piston has one face in contact with the shock absorbing liquid, and an anti-crash tube mounted to slide relative to the sliding rod and including an energy-absorbing member.

5 Claims, 2 Drawing Sheets

FIG_1

RAISABLE ANTI-CRASH SHOCK ABSORBER

The present invention relates to a raisable anti-crash shock absorber, in particular for a helicopter.

BACKGROUND OF THE INVENTION

It is known that vertical take-off aircraft, and in particular helicopters, need to have shock absorbers that are capable not only of absorbing shock during normal landing, but also of absorbing energy in the event of a crash landing, with the energy-absorption function being intended to avoid, if possible, damage to the aircraft itself, and in any event to reduce the stresses suffered by the bodies of passengers in the aircraft. It is also often required that the shock absorber should be raisable so as to enable the landing gear to be retracted into an appropriate housing in flight.

SUMMARY OF THE INVENTION

The present invention provides a raisable anti-crash shock absorber comprising: a strut; a sliding rod mounted to slide relative to the strut and to co-operate therewith to define both a raising chamber connected to a member for feeding raising liquid and a shock absorbing chamber containing both a gas under pressure and a shock absorbing liquid in which there extends a transverse partition fitted with throttling means; a dip rod defining a lowering chamber connected to a member for feeding it with lowering liquid and in which a lowering piston is disposed, which piston has a face that is in contact with the shock absorbing liquid; and an anti-crash tube slidably mounted relative to the sliding rod and including energy-absorbing means.

In an advantageous version of the invention, the energy-absorbing means comprise a composite tube disposed inside the anti-crash tube and having one end bearing against the sliding rod and another end bearing against the inside of the anti-crash tube. Preferably, the shock absorber includes a shear pin securing the anti-crash tube to the sliding rod.

BRIEF DESCRIPTION OF THE DRAWINGS

Embodiments of the invention are described by way of example with reference to the accompanying drawings, in which.

DETAILED DESCRIPTION

Figure 1:
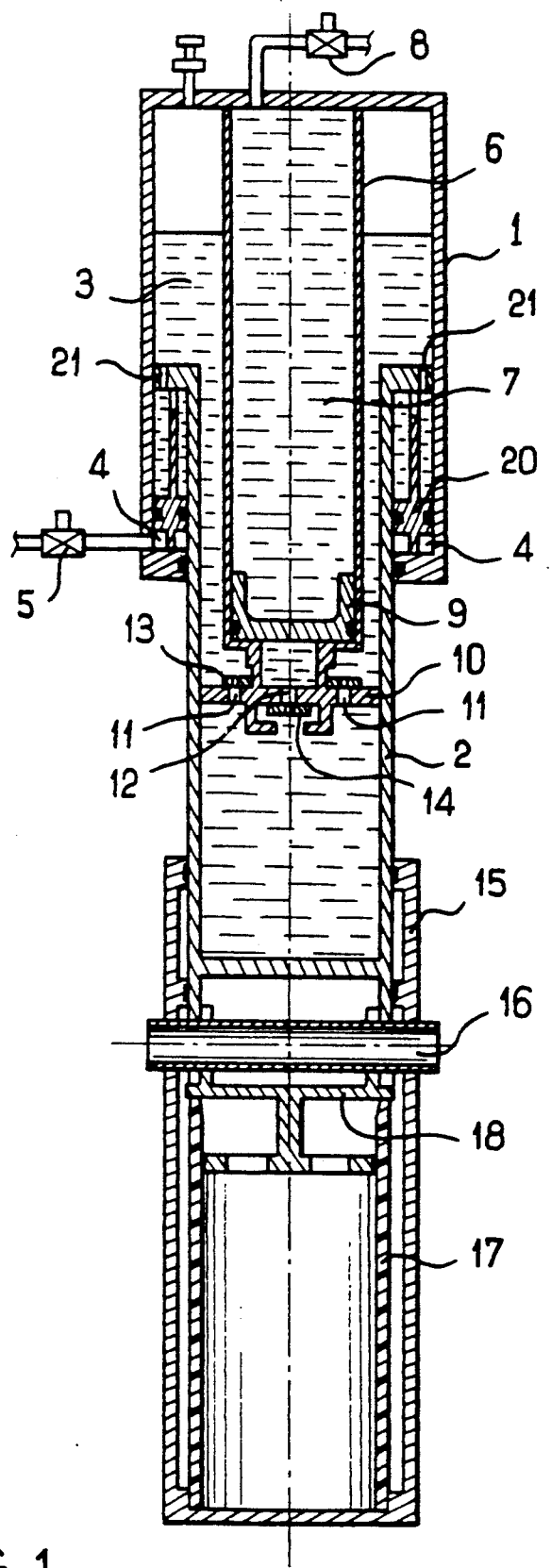
FIG. 1 is an axial section view through a first embodiment of the invention.

With reference to FIG. 1, a raisable anti-crash shock absorber of the invention comprises a strut 1 in which a sliding rod 2 is slidably mounted and co-operates with the strut to define a shock absorbing chamber 3 containing a gas under pressure and a shock absorbing liquid, and also a raising chamber 4 connected to a feed member 5 for feeding raising liquid. A dip rod 6 is fixed inside the strut and defines a lowering chamber 7 connected to a feed member 8 for feeding lowering liquid. A lowering piston 9 is disposed in the lowering chamber 7 and separates the lowering liquid from the shock absorbing liquid contained in the shock absorbing chamber 3. The bottom end of the dip rod 6 carries a partition 10 which extends transversely to the shock absorbing chamber 3 within the shock absorbing liquid. The transverse partition 10 includes throttling orifices 11 for throttling the shock absorbing liquid during displacement of the sliding rod 2 relative to the strut 1, and a wide orifice 12 allowing the shock absorbing liquid to flow easily during lowering movements of the lowering piston 9. An annular throttling valve member 13 is placed facing the throttling orifices 11 to provide greater throttling in expansion than in compression, and a throttling valve member 14 is disposed facing the wide orifice 12 to provide compression throttling in the event of a crash associated with a hydraulic breakdown that prevents the lowering chamber 7 being fed with fluid, as described below.

An anti-crash tube 15 is slidably mounted on the bottom end of the sliding rod 2 and is prevented from sliding relative to the sliding rod by a shear pin 16, i.e. a pin having a rupture threshold. A tube of composite material 17 is disposed longitudinally inside the anti-crash tube 15. The bottom end of the composite tube 17 bears against the bottom of the anti-crash tube 15 while its top end bears against a centering piece 18 secured to the sliding rod 2.

An annular raising piston 20 is disposed in the raising chamber 4. The bottom face of the raising piston 20 is in contact with the raising liquid while its top face is in contact with the shock absorbing liquid which can penetrate above the raising piston 20 via orifices 21.

The shock absorber of the invention operates as follows. In normal operation, i.e. when the landing gear is lowered, the member for feeding raising liquid 5 is connected to exhaust, and the member for feeding lowering liquid 8 is closed after the lowering chamber 7 has been filled with lowering liquid until the piston 9 comes into abutment against the bottom end of the dip rod 6 as shown in FIG. 1. The lowering piston 9 is thus hydraulically locked in its low position.

During landing or take-off, the sliding rod 2 moves inside the strut 1 as a function of forces that are applied to the sliding rod, which forces are opposed by the force exerted by the gas under pressure in the shock absorbing chamber 3. During these movements, the shock absorbing liquid is throttled by the orifices 11 and the throttling valve member 13.

In the event of a crash landing with the landing gear lowered, the shear pin 16 breaks when the compression force on the sliding rod reaches a value greater than its rupture threshold, and the anti-crash tube 15 then moves relative to the sliding tube 2, crushing the composite tube 17 which absorbs a portion of the energy due to the crash landing.

To raise the landing gear associated with the shock absorber, the feed member 8 for feeding lowering liquid is connected to exhaust while raising liquid is delivered via the raising member 5. Under the effect of the raising liquid, the piston 20 is pushed upwards and causes the sliding rod 2 to be retracted into the strut. The shock absorbing liquid contained in the shock absorbing chamber 3 is then expelled through the throttling valve member 14 and causes the piston 9 to rise inside the dip rod 6.

In the event of a hydraulic breakdown, the feed member 5 for feeding the raising liquid and the feed member 8 for feeding lowering liquid are both connected to exhaust (by a safety circuit which is known per se and not shown). The weight of the landing gear and the pressure of the gas in the shock absorbing chamber 3 then tend to cause the landing gear to be lowered into its utilization position. During such movement, the shock absorbing liquid contained between the lowering piston 9 and the transverse partition 10 flows easily through the wide orifice 12, while the shock absorbing liquid in contact with the gas under pressure is throttled by the valve member 13. The major portion of the shock absorbing liquid contained beneath the lowering piston 9 therefore enters the bottom portion of the shock absorbing chamber 3 until the shock absorber is fully extended. At the moment of landing per se, whether under control or a crash landing, the shock absorber is compressed and the shock absorbing liquid tends to rise through the transverse partition. The shock absorbing liquid rising beneath the lowering piston 9 (which is not locked in position because of the hydraulic breakdown) is nevertheless limited by the throttling valve member 14 such that during this movement the major fraction of the shock absorbing liquid passes through the throttling orifices 11, and the extent to which the shock absorber is pushed in is therefore essentially determined by the flow through the orifices 11 and by the resulting increase in the pressure of the gas. When landing too hard, the flow through the orifices 11 and the throttling valve member 14 is insufficient and the resulting resistance of the shock absorber to being pushed in causes the shear pin 16 to be broken, bringing the energy absorbing tube 17 into action.

Figure 2:
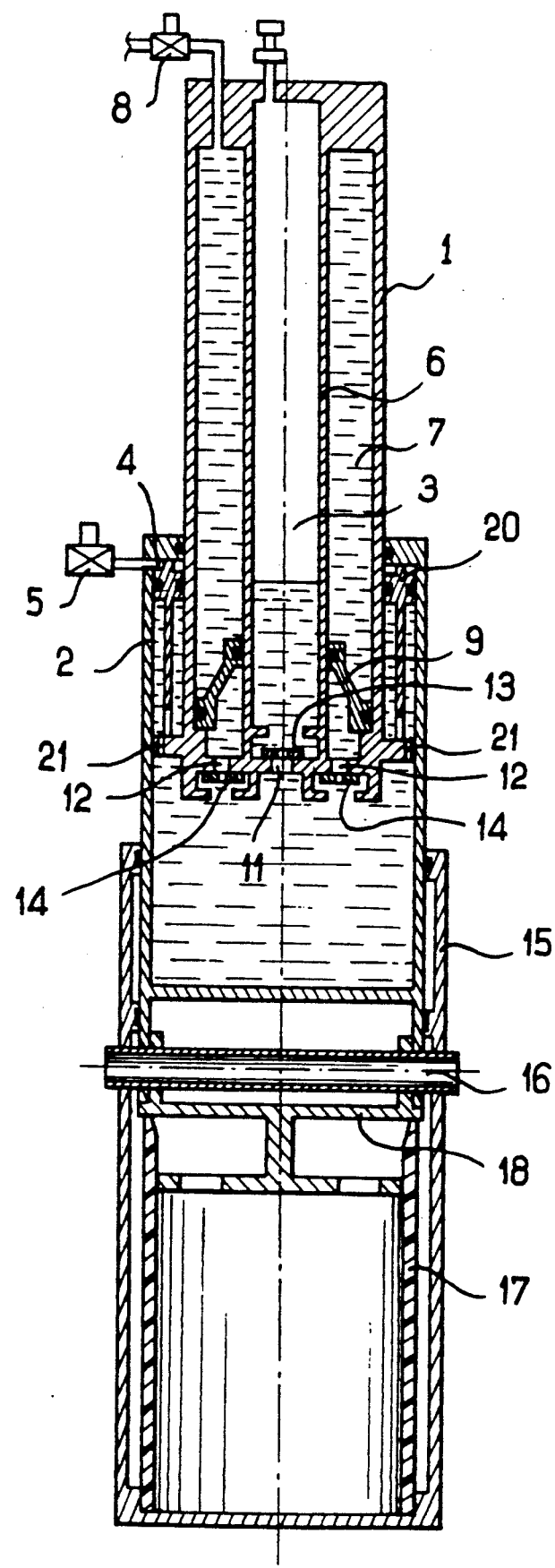
FIG. 2 is an axial section view through a second embodiment of the invention.

FIG. 2 shows a variant embodiment of the shock absorber of the invention in which elements that are identical in function to the elements of FIG. 1 are given the same numerical references. It can easily be seen that this variant embodiment differs from the first embodiment shown merely by the relative disposition of certain components of the shock absorber. In particular, in this case, the sliding rod 2 is mounted outside the strut 1 and the shock absorbing chamber 3 extends inside the dip rod 6 instead of extending around it as in the preceding embodiment. The lowering piston 9 is thus an annular piston surrounding the dip rod 6.

Naturally, the invention is not limited to the embodiments described and variants will occur to the person skilled in the art. In particular, the shock absorber may be lowered and raised without throttling by eliminating the orifice 12 and the throttling valve member 14 and by making a linking orifice of large dimensions through the transverse partition 10 between the shock absorbing chamber 3 and the piston 9. It is also possible to eliminate the raising piston 20, providing the communication orifices 21 are simultaneously omitted, and providing sealing is ensured between the sliding rod 2 and the strut 1. The use of a raising piston 20 nevertheless has the advantage of preventing cavitation in the duct for feeding raising liquid while the sliding rod is being retracted into the strut 1 during normal use of the shock absorber.

It is also possible to replace the composite tube 17 by any other energy-absorbing means, e.g. by a gas under pressure maintained at a pressure greater than the normal pressure of the compressed gas in the shock absorbing chamber 3.

I claim:

1. A raisable anti-crash shock absorber comprising: a strut; a sliding rod mounted to slide relative to the strut and to co-operate therewith to define both a raising chamber connected to a member for feeding raising liquid, and a shock absorbing chamber containing both a gas under pressure and a shock absorbing liquid in which there extends a transverse partition fitted with throttling means; wherein the shock absorber further comprises a dip rod defining a lowering chamber connected to a member for feeding it with lowering liquid and in which a lowering piston is disposed, which piston has a face that is in contact with the shock absorbing liquid; and an anti-crash tube slidably mounted relative to the sliding rod and including energy-absorbing means.

2. A raisable anti-crash shock absorber according to claim 1, wherein the energy-absorbing means comprise a composite tube disposed inside the anti-crash tube and having one end bearing against the sliding rod and another end bearing against the inside of the anti-crash tube.

3. A raisable anti-crash shock absorber according to claim 2, including a shear pin having a rupture threshold securing the anti-crash tube to the sliding rod.

4. A raisable anti-crash shock absorber according to claim 1, including throttling means between the shock absorbing chamber and the lowering piston.

5. A raisable anti-crash shock absorber according to claim 1, wherein a raising piston is disposed in the raising chamber.

* * * * *